United States Patent
Suzuki

(10) Patent No.: US 6,703,445 B2
(45) Date of Patent: Mar. 9, 2004

(54) MOLDING THERMOPLASTIC RESIN MATERIAL AND A METHOD FOR EQUAL QUALITY RECYCLE OF THERMOPLASTIC RESIN MOLD

(75) Inventor: Yasuhiro Suzuki, Suzuka (JP)

(73) Assignee: Suzuka Fuji Xerox Co., Ltd., Mie (JP)

( * ) Notice: Subject to any disclaimer, the term of this patent is extended or adjusted under 35 U.S.C. 154(b) by 0 days.

(21) Appl. No.: 09/969,975

(22) Filed: Oct. 3, 2001

(65) Prior Publication Data

US 2002/0099135 A1 Jul. 25, 2002

(30) Foreign Application Priority Data

Nov. 22, 2000 (JP) .......................................... 2000-356781

(51) Int. Cl.$^7$ .............................. C08K 5/54; C08J 11/04; C08L 51/06
(52) U.S. Cl. .............................. 525/64; 525/68; 525/69; 525/319; 521/47
(58) Field of Search ............................ 525/64, 68, 69, 525/319; 521/47

(56) References Cited

U.S. PATENT DOCUMENTS

| | | | | |
|---|---|---|---|---|
| 4,631,307 A | * | 12/1986 | Hosoda et al. | 525/64 |
| 5,015,690 A | * | 5/1991 | Williams | 525/73 |
| 5,229,456 A | * | 7/1993 | Ilenda et al. | 525/65 |
| 5,804,655 A | * | 9/1998 | Miyatake et al. | 525/69 |

OTHER PUBLICATIONS

"Suzuka Fuji Xerox Succeeds in Recycling a Thermoplastic Resin without Degrading Impact Strength", Nikkei Mechanical, Feb. 2000, vol. No. 545, p. 64–65 (and English Translation).

* cited by examiner

*Primary Examiner*—James J. Seidieck
*Assistant Examiner*—Olga Asinovsky
(74) *Attorney, Agent, or Firm*—Donald S. Dowden; Cooper & Dunham LLP

(57) ABSTRACT

The object of the present invention is to provide a molding thermoplastic resin material giving resin mold whose quality and value are substantially equal to original resin mold even in a case where said resin mold is recycled.

To attain said object, olefin group rubber and/or acrylic rubber to which monomer(s) being the same or similar monomer as (to) monomer(s) composing said molding thermoplastic resin material is(are) graft-copolymerized to give said rubbers compatibility with said molding thermoplastic resin material is(are) added in said molding thermoplastic resin material to improve said equal quality recycling property (property that quality and value are substantially equal to original thermoplastic resin mold even in a case where said thermoplastic resin mold is recycled).

Said olefin group rubber and/or said acrylic rubber has(have) excellent thermal stability, heat-resistance, ozone resistance, oxidation resistance, and durability and has(have) effect on improvement of impact resistance for said thermoplastic resin material which is substantially immutable against heat history affected by repeated recycles and said molding thermoplastic resin material of the present invention can be used as a resin material of equal quality resin mold whose quality and value are substantially equal to resin mold using virgin resin material even in a case where said resin mold is recycled.

14 Claims, No Drawings

MOLDING THERMOPLASTIC RESIN MATERIAL AND A METHOD FOR EQUAL QUALITY RECYCLE OF THERMOPLASTIC RESIN MOLD

FIELD OF THE INVENTION

The present invention relates to a molding thermoplastic resin material for recycled resin mold having substantially equal quality to original resin mold and further relates to a method for equal quality recycling of thermoplastic resin mold.

BACKGROUND Of THE INVENTION

There are three kinds of recycle system of discarded thermoplastic resin mold. One system is chemical recycling system such as decomposition of thermoplastic resin of said discarded resin mold to produce a monomer or chemical treatment of said discarded resin mold to produce a useful product, a second system is thermal recycling in which thermal energy produced by combustion treatment of said discarded resin mold is utilized, and a third system is material recycling system in which said discarded resin mold is shattered and heated and melted for such as pelletizing to re-use molded material. Said chemical recycling system has disadvantage that chemical treatment is necessary and said thermal recycling system has problem of atmospheric pollution when said discarded resin mold is burned so that material recycling may be the most preferable recycling system. In said material recycling, especially equal quality recycling is preferable, in which thermoplastic resin mold recycled from discarded virgin resin mold has substantially the same quality and value.

PRIOR ART

In recycle process of said discarded resin mold, said discarded resin mold may be shattered, if necessary heated and melted and pelletized. Accordingly, temperature higher than the softening point or melting point, mechanical stress such as agitation, pressure, and the like may have effect on said thermoplastic resin of said resin mold. By accumulation of said thermal stress and mechanical stress, said thermoplastic resin may be denatured and the mechanical properties such as impact strength of resulting resin mold may be degraded.

Especially, impact strength of acrylonitrile-butadiene-styrene resin (ABC), high impact polystyrene (HIPS) including styrene-graft-butadiene rubber and the like degrade remarkably by repeated recycle since said resins contain butadiene rubber having poor thermal stability.

Further, the mixture, polymer blend, or polymer alloy of said thermo plastic resins including said butadiene rubber and polyphenylene ether (PPE), polycarbonate (PC), polyamide(PA), polyethylene terephthalate (PET), polybutylene terephthalate (PBT), polysulfone (PSF), polyetherimide (PEI), polypropylene (PP) and the like are frequently used as molding materials but the mechanical properties of said mixture, polymer blend, or polymer alloy are apt to be degraded by thermal degradation of butadiene rubber contained in said mixture, polymer blend or polymer alloy.

Further, two mechanical properties of polymer blend or polymer alloy of thermoplastic resin containing said butadiene rubber and polyester group resin are more remarkably degraded by recycling since said polyester group resin is apt to be hydrolyzed.

Currently, a method has been provided to prevent the degradation of mechanical properties, especially impact strength of said thermoplastic plastic resin during said recycling in which rubber or thermoplastic elastomer having compatibility with said thermoplastic resin is added as a recycle aid agent.

Nevertheless, said traditional method in which said recycle aid agent is added in each recycle stage has problems in that a lot of labour and time are necessary and material cost may become great in said traditional method. Further, the content of said recycle aid agent in said thermoplastic resin may increase during repeated recycle process so that the mechanical properties of said resin mold is affected and equal quality recycling cannot be attained and only the resin mold having low quality can be provided.

SUMMARY OF THE INVENTION

Accordingly, the object of the present invention is to provide a recycled resin mold which has substantially the same quality as original resin mold. Said recycle system may be called equal quality recycle system.

To attain said object, the present invention provide a molding thermoplastic resin material for recycled resin mold having substantially equal quality to original resin mold consisting of molding thermoplastic resin material in which olefin group rubber and/or acrylic rubber is(are) added as equal quality recycle aid agent wherein the same or similar monomer(s) as(to) monomers composing said thermoplastic resin is(are) graft-copolymerized to give said olefin group rubber and/or acrylic rubber compatibility with said molding thermoplastic resin material.

Diene group may be added in said molding thermoplastic resin material and it is desirable that IZOD impact strength (ASTM-D256) of said molding thermoplastic resin material is maintained at virgin thermoplastic resin's IZOD impact strength of 70% or over after said thermoplastic resin material is heated at 250° C. for 1.0 hour. Further it is desirable that a graft ratio of said monomer(s) to said olefin group rubber and/or acrylic rubber is 20% and over by weight. Still further it is desirable that said molding thermoplastic resin material is styrene group polymer and said equal quality recycle aid agent is styrene group monomer graft-copolymerized olefin group rubber and/or acrylic rubber or said molding thermoplastic resin material is nitrile group monomer and styrene group monomer copolymer and said equal quality recycle aid agent is nitrile group monomer and styrene group monomer graft-copolymerized olefin group rubber and/or acrylic rubber. Further, for instance, said molding thermoplastic resin material is polyphenylene ether group resin or polymer alloy of polyphenylene ether and polystyrene and said equal quality recycle aid agent is styrene graft-copolymerized olefin group rubber and/or acrylic rubber and said equal quality recycle aid agent is rubber-like polymer in which styrene group monomer and/or nitrile group monomer is (are) graft-copolymerized to ethylene-propylene copolymer and/or ethylene-propylene-diene terpolymer, and it is desirable that said ethylene-propylene-diene terpolymer is ethylene-propylene-dicyclopentadiene terpolymer. Still further it is desirable that a molar ratio of ethylene/propylene in said ethylene-propylene copolymer or said ethylene-propylene-diene terpolymer is 60/40 and over and Mooney viscosity ($ML_{1+4}$, 100° C.) of said ethylene-propylene copolymer or ethylene-propylene-diene terpolymer is in the range of 5 to 150. Still further it is desirable that a molar ratio of n-butyl acrylate/butadiene of said acrylic rubber is 50/50 and over and nitrile group monomer and styrene group monomer are graft-copolymerized to said acrylic rubber in a weight ratio in the range of 20/80 to 30/70. Further the present invention provides a method for equal quality recycle of thermoplastic resin mold comprising molding by using molding material of discarded resin mold of said thermoplastic resin material in accordance with claim 1 to 12 to produce a resin mold having substantially equal quality to former resin mold. It is desirable that IZOD impact strength (ASTM-D256) of said resin mold is 90% and over of said preceding resin mold.

Said olefin group rubber and acrylic rubber have poor compatibility with polystyrene group resin such as polystyrene (PS), nitrile group monomer-styrene group monomer copolymer such as acrylonitrile-styrene copolymer (AS), polyphenylene ether, and the like so that the same or similar monomer(s) as(to) monomer(s) composing said polystyrene group resin is(are) graft-copolymerized to said rubbers to give compatibility with said rubbers. For instance, in the case of polystyrene, styrene group monomer is graft-copolymerized to said olefin group rubber or said acrylic rubber and in the case of acrylonitrile-styrene copolymer, nitrile group monomer and styrene group monomer are graft-copolymerized to said olefin group rubber or acrylic rubber, and further in the case of polyphenylene ether or polyphenylene ether modified by styrene group resin, and the like, styrene group monomer which forms graft chain by compatibility with phenylene ether unit or polystyrene in polyphenylene ether is graft-copolymerized to said olefin group rubber or said acrylic rubber. As a result, solubility parameter of said olefin group rubber or said acrylic rubber is adjusted to be equal or similar with (to) said thermoplastic resin to get good compatibility with them.

As above described, since said graft polymer added to the molding thermoplastic resin as the equal quality recycle aid agent has compatibility with said thermoplastic resin, said graft polymer is stably dispersed in said thermoplastic resin, and said olefin group rubber and acrylic rubber of said graft polymer have good thermal stability, good durability and the like, so that said rubbers per se show little degradation in repeated recycle. Accordingly, said thermoplastic resin, even thermoplastic resin containing diene-group rubber shows little degradation of the mechanical properties, especially impact resistance in repeated recycle when said equal quality recycle aid agent is added.

For instance, in said thermoplastic resin of the present invention, 70% and over of IZOD impact strength(ASTM-D256) is ensured after heating at 250° C. for one hour, said condition corresponding recycle repeated 20 times and over, and further 90% and over of IZOD impact strength is ensured after one time recycle. Accordingly, in the present invention, the thermoplastic resin recovered from the discarded thermoplastic resin mold can give the thermoplastic resin mold having substantially the same quality as the original thermoplastic resin mold, namely, the quality can be called equal quality recycled.

DETAILED DESCRIPTION

Molding Thermoplastic Resin Material

The molding thermoplastic resin material used in the present invention may include any kind of thermoplastic resin commonly used for molding. Said thermoplastic resin may be such as polystyrene resins polymerized with polystyrene monomers, such as polystyrene (PS), high impact polystyrene (HIPS) and the like, styrene resins including nitrile monomers and styrene monomers, such as acrylonitrile-styrene copolymer (AS) and the like, styrene resins including nitrile monomers, styrene monomers and butadiene monomers, such as acrylonitrile-styrene-butadiene copolymer (ABS) and the like, polyolefin resins such as polyethylene (PE), polypropylene (PP) and the like, engineering plastics such as polyphenylene ether (PPE), polycarbonate (PC), polyamide (PA), polysulfone (PSF), polyetherimide (PEI), poly methyl methacrylate (PMMA) and the like, polyester resins such as polyethylene terephthalate (PET), polybutylene terephthalate (PBT) and the like, and the like, and a mixture thereof including two kinds and over of said thermoplastic resins mentioned above.

Especially the present invention may be usefully applied for polystyrene group resin, nitrile group monomer-styrene group monomer copolymer, PPE, and ABS, HIPS, modified PPE containing ABS and/or HIPS, mixture or polymer blend or polymer alloy which contain diene group rubber having poor heat resistance such as butadiene rubber, isoprene rubber, chloroprene rubber, and the like.

A: Styrene Group Resin

Styrene group resin used in the present invention contains 25% and over by weight of styrene group monomer in the polymer and said styrene group resin may include such as homo polymer of styrene group monomer, copolymer of two or more kinds of said styrene group monomer, copolymer of one or more kind(s) of said styrene group monomer and one or more kind(s) of monomer which can copolymerize with said styrene group monomer, graft copolymer in which one or more kind(s) of said styrene group monomer is(are) graft-copolymerized to said diene group rubber, microblend or polymer blend of said styrene group resin and said diene group rubber, and the like.

Typical styrene group resin may be such as polystyrene homopolymer (PS), high impact polystyrene (HIPS), which is a blend polymer including polystyrene and rubbery polymer which is that styrene monomer is grafted into said diene rubbers, acrylonitrile-styrene copolymer (AS), styrene-butadiene copolymer, styrene-α-methyl styrene copolymer, styrene-maleic anhydride copolymer, styrene-methylmethacrylate copolymer, styrene-ethylene copolymer, styrene-ethylene-propylene-butadiene copolymer, ABS resin, which is a blend polymer including acrylonitrile-styrene copolymer and graft copolymer which is that acrylonitrile monomer and styrene monomer are grafted into butadiene rubber, ACS resin, which is a mixture resin including chlorinated polyethylene and acrylonitrile-styrene copolymer, AES resin, which is a mixture resin including acrylonitrile-styrene copolymer and terpolymer which is that acrylonitrile monomer and styrene monomer are grafted into olefin rubbers, AAS resin, which is a mixture resin including acrylonitrile-styrene copolymer and terpolymer which is that acrylonitrile monomer and styrene monomer are grafted into acrylic rubbers, ASiS resin, which is a mixture resin including acrylonitrile-dimethylsiloxane-styrene copolymer and acrylonitrile-butadiene-styrene copolymer resin, and the like.

B: Polyphenylene Ether(PPE) Group Resin

Typical PPE resin used in the present invention includes such as 2,6-dimethyl-1,4-phenylene ether prepared by oxidative polymerization of 2,6-xylenol by using copper catalyst and further include copolymer of 2,6-dimethyl-1,4 phenylene ether and 2,3,6,-trimethyl-1,4-phenylene ether, copolymer of 2,6-dimethyl phenol and 2,3,6,-trimethyl phenol, and the like. Further modified PPE group resin modified with styrene group resin and/or amide resin are also included in the present invention.

C: Polycarbonate Resin (PC Resin)

In the present invention, PC resin may be singly used as said molding thermoplastic resin or polymer alloy or polymer blend of PC resin and said styrene group resin or said PPE group resin are also used as said molding resin.

Any kind of poly carbonic ester derived from aromatic dihydroxy compound can be used as PC resin of the present invention.

Said aromatic dihydroxy compound may be such as 2,2-bis(4-hydroxyphenyl)propane (i.e. bisphenol A), tetramethylbisphenol A, tetrabromobisphenol A, bis (4-hydroxyphenyl)-p-diisopropylbenzene, hydroquinone, resorcinol, 4,4'-dihydroxydiphenyl and the like and generally bis(4-hydroxyphenyl) alkane group dihydroxy compound is selected and especially bisphenol A or the combination of bisphenol A and other aromatic dihydroxy compound is preferably selected.

D: Polyolefin Group Resin

Polyolefin resin is produced by polymerization of one or more kind(s) of α-olefin by using radical initiator such as metal oxide group catalyst, Ziegler-Natta catalyst, Kaminsky catalyst and the like and two or more kinds of said polyolefin resin may be mixed together. Said α-olefin is linear, blanching or cyclic olefin having polymerizable double bond and α-position and generally α-olefin having 2 to 8 carbon atoms is selected.

Concretely, said α-olefin includes ethylene and propylene.

Other monomer which can be copolymerized with α-olefin may be copolymerized in said polyolefin group resin of the present invention.

Said other monomer may be such as α-β unsaturated organic acid such as acrylic acid, methacrylic acid, maleic acid, itaconic acid, methyl acrylate, ethyl acrylate, methyl methacrylate, maleic anhydride, arylmaleimide, alkylmaleimide and the like, the derivatives thereof, vinyl ester such as vinyl acetate, vinyl butyrate and the like, aromatic vinyl compound such as styrene, methyl styrene and the like, and vinyl silane such as vinyl trimethoxysilane, γ-methacryloyloxipropyltrimethoxysilane and the likeand the like and further a little amount of non conjugated diene such as 1,4 hexadiene, 4-methyl-1,4hezadiene, 5-4-methyl-1,4-hexadiene, dicyclopentadiene, ethylidene norborner(4-ethlidene-2-norborner ) and the like may be copolymerized.

Typical olefin group resin may be polyethylene, polypropylene, ethylene-vinylacetate copolymer, ethylene-acrylic acid copolymer, and the like.

Said polyolefin resin may be singly used as molding material or mixture of two or more kinds of said polyolefin resin or mixture of said polyolefin group resin and other thermoplastic resin(s) such as said styrene group resin such as PS, HIPS, AS, ABS resin, PPE group resin and the like may be used as said polyolefin resin.

E: Polymer Blend, Polymer Alloy

Typical molding thermoplastic resin materials of the present invention are above explained. Further two or more kinds of said thermoplastic resin may be mixed to be polymer blend or polymer alloy. Said polymer blend or polymer alloy may be produced by screw-mixing in the extruder.

Further above mentioned diene rubbers, olefin rubbers, acrylic rubbers, such as NR, BR, SBR, STR, IR, CR, CBR, IBR, IBBR, IIR, acrylic rubber, polysulfide rubber, urethane rubber, polyether rubber, epichlorohydrin rubber, chlorobutyl rubber, hydrogenated nitorile rubber, fluorinated rubbers and the like, vinyl resins such as ethylene/vinyl acetate copolymer, acrylic resin, ethylene/ethyl acrylate copolymer, vinyl chloride and the like, other thermoplastic resin such as polynorbornene and the like may be mixed in said molding thermoplastic resin material to improve impact strength.

Further thermoplastic elastomer (TPE) may be mixed in said molding thermoplastic resin material. Said thermoplastic elastomer has properties of vulcanized rubber in ordinary temperature but has plasticity and so has moldability and consists of hard segment and soft segment.

Said TPE may be such as urethane group elstomer, styrene group elastomer, vinyl group elastomer, ester group elastomer, and the like.

Equal Quality Recycle Aid Agent

A: Olefin Group Rubber Graft-polymer

Olefin group rubber used in said equal quality recycle aid agent of the present invention is polymer or copolymer of one or more kind(s) of α-olefin or copolymer of one or more kind(s) of said α-olefin and one or more kind (s) of other monomer(s) which can be copolymerized with said α-olefin (s). Typically, said olefin group rubber may be copolymer of ethylene and one or more kind(s) of other α-olefin(s) or copolymer of ethylene and one or more kind(s) of other α-olefin(s) and other monomer(s) which can be copolymerized with said α-olefin, especially said other monomer is non-conjugated diene compound.

In said ethylene-α-olefin group copolymer, α-olefin which is copolymerized with ethylene may be α-olefin having 3 to 12 carbon atoms such as propylene, butene-1, 4-methyl pentene-1, hexane-1, Octene-1, and the like.

Said non-conjugated diene compound may be such as dicyclopentadiene, tricyclopentadiene, 5-methyl-2,5-norbornadiene, 5-methylene-2-norbornene, 5-vinyl-2-norbornene, 5-ethylidene-2-norbornene, 5-isopropylidene-2-norbornene, 5-isopropenyl-2-norbornene, 5-(1-butenyl)-2-norbornene, 5-(2-propenyl)-2-norbornene, 5-(5-hexenyl)-2-norbornene, 4,7,8,9-tetrahydro-indene, isopropylidenetetrahydro-indene, cyclooctadiene, vinylcyclohexene, 1,5,9-cyclododecatoluene, 6-methyl-4,7,8,9-tetrahydroindene, 2,2'-dicyclopentenyl, trans-1,2-divinylcyclobutane, 1,4-hexadiene, 1,8-nonadiene, 1,9-decadiene, 3,6-dimethyl-1,7-octadiene, 4,5-dinethyl-1,7-octadiene, 1,4,7-octatriene, 5-methyl-1,8-nonadiene and the like.

Preferably said non-conjugated diene compound may be 5-ethylilidine-2-norbornen(ENB) and/or dicyclopentadiene (DCP), more preferably dicyclopentadiene. Mixture of olefin group rubber graft polymer containing 5-ethylidene-2-norbornen and AS or PS gives resin mole having a good appearance. Further, in the case of said olefin group rubber graft polymer containing EPDM, impact strength of the resulting resin mold may be higher than in the case of said olefin group rubber graft polymer containing EPM.

Molar ratio of ethylene-α-olefin and a non-conjugated diene compound if necessary in said olefin group rubber graft polymer ethylene/α-olefin/non-conjugated diene compound is preferably 0.2~1.0/0.2~0.8/0~0.2 and more preferably 0.5~0.9/0.25~0.75/0~0.1 and molar ratio of ethylene/propylene is 60/40 and over, preferably 65/35 and over and from a standpoint of equal quality recycle, EPM or EPDM in which ethylene is richly contained is preferably used.

Further Mooney viscosity ($ML_{1+4}$, 100° C.) of said ethylene-α-olefin group copolymer is preferably 5 to 150, more preferably 10 to 120, the optimum viscosity is 20 to 80.

Typical olefin group rubber may be ethylene-propylene copolymer rubber (EPM), ethylene-propylene-non conjugated diene compound terpolymer (EPDM), ethylene-butene copolymer rubber, (EBM) ethylene-butene-non-conjugated diene compound terpolymer(EBDM). The same non-conjugated diene compound as used in EPDM may be used in EBDM.

To give compatibility with the objective thermoplastic resin to said olefin group rubber, styrene group monomer and/or nitrile group monomer is (are) graft-copolymerized to said olefin group rubber.

Said styrene group monomer being graft-copolymerized to said olefin group rubber may be such as one or more kinds of styrene monomers comprising of styrene, α-alkylmonovinylidene aromatic monomer (e.g. α-methylstyrene, α-ethylstyrene, α-methylvinyltoluene, α-methyldialkylstyrene and the like), cyclo-substituted alkylstyrene (e.g. o, m, or p-vinyltoluene, o-ethylstyrene, p-ethylstyrene, 2,4-dimethylstyrene, p-tert butylstyrene and the like), cyclo-substituted halo styrene (e.g. o-chlorostyrene, p-chlorostyrene, 2,4-dichlorostyrene and the like), cyclo-alkyl, cyclo halo substituted styrene (e.g. 2-chloro-4-methylstyrene, 2,6-dichlorostyrene and the like), vinyl naphthalene, vinyl anthracene and the like.

In general, alkyl group having 1 to 4 carbon atom(s) includes both liner chain and branched chain.

Said nitrile group monomer being graft-copolymerized to said olefin group rubber may be such as acrylonitrile, methacrylonitrile, ethacrynitrile, fumaronitrile, mixture of two or more kinds of said nitrile, and the like.

Besides said styrene group monomer and said nitrile group monomer, other monomer (third monomer) may be copolymerized. Any kind of monomer which can be copolymerized with said styrene group monomer and nitrile group monomer may be copolymerized.

Said third monomer may be such as (meth)acrylates such as methyl(meth)acrylate, ethyl(meth)acrylate and the like, maleimides such as N-phenylmaleimide, maleimide, N-methylmaleimide, N-ethylmaleimide, (p-bromophenyl) maleimidemethacrylate, cyclohexylmaleimide and the like, unsaturated nitrile compounds such as maleic anhydride methacrylonitrile and the like.

Alkyl ester having 1 to 4 carbon atoms, especially methacrylate is preferable as (meth)acrylate.

To graft-polymerize said monomer(s) to said olefin rubber, polymerization system in which said monomer(s) is(are) polymerized by oil soluble or water soluble initiator and/or high energy ray such as ultraviolet ray, electron beam, and the like under existence of said olefin group rubber is applied. In said polymerization system, general polymerization method such as bulk polymerization, suspension polymerization, solution polymerization, emulsion polymerization and the like is applied.

Said graft olefin group rubber produced by said graft polymerization includes both graft polymer in the narrow sense consisting of olefin group rubber as a trunk and a polymer chain of said monomer(s) as a branch and mixture of said graft polymer in the narrow sense and olefin group rubber and/or polymer of said monomer(s).

Said olefin group rubber graft polymer suitable for each of said thermoplastic resin is explained below.

(1) Graft Polymer for Styrene Group Resin

One or more kind(s) of styrene group monomer(s) graft polymerized olefin group rubber (styrene graft olefin group graft polymer) is used for the styrene group resin. Said styrene group monomer is illustrated in A: Styrene group resin. Said styrene graft olefin group graft polymer has the polymer branch chain of said styrene group monomer having substantially the same solubility parameter as said styrene group resin, especially PS so that said styrene graft olefin group graft polymer has good compatibility with PS.

For styrene group resin, especially AS or ABS, one or more kind(s) of styrene group monomer and one or more kind(s) of nitrile group monomer are graft polymerized to said olefin group rubber (styrene-nitrile graft olefin graft polymer).

Other monomer(s) which can be copolymerized with said styrene group monomer(s) and said nitrile group monomer(s) may be copolymerized with said styrene group monomer(s) and said nitrile group monomer(s). Said monomer is illustrated in A: Styrene resin.

Said styrene-nitrile graft olefin group graft polymer has the styrene-nitrile copolymer branch chain having substantially the same solubility parameter as As or ABS so that said styrene-nitrile graft olefin group graft polymer has a good compatibility with AS or ABS.

In said olefin group rubber graft polymer, mixture of two or more olefin group rubber may be used as said olefin group rubber. In said olefin group rubber graft polymer, content of said olefin group rubber is generally 10 to 20% by weight, preferably 15 to 75% by weight, content of monomer(s) grafted( graft ratio) is generally 90 to 20% by weight, preferably 55 to 25% by weight, and in the case of styrene-nitrile graft olefin group rubber graft polymer, content of styrene group monomer is preferably 5 to 95% by weight and content of nitrile group monomer is preferably 95 to 5% by weight. In above described range, compatibility of said olefin group rubber graft polymer with said thermoplastic resin and improvement effect of equal quality recycling on said thermoplastic resin, namely degradation preventing effect on impact strength of said thermoplastic resin can be balanced.

Especially, said olefin group rubber has poor adhesiveness with paint film so that said thermoplastic resin mold in which said olefin group rubber graft polymer having a low graft ratio is mixed has undesirably poor adhesiveness with paint film or ink film. Nevertheless, since said olefin group rubber graft polymer has core-shell structure in which rubber component is core and graft chain is shell, so long as said olefin rubber graft polymer having a higher graft ratio in the range between 90 to 20% by weight is used to mix said molding thermoplastic resin material, the problem of poor adhesiveness with paint film may not take place.

The particle size of said olefin group graft polymer is desirably in the range between monocular level (solution) to 5.0 μm forming sea-island structure or other structure by dissolving and more desirably in the range between 0.001 to 2.0 μm. In this range of the particle size, the effect of the equal quality recycling of said olefin group rubber graft polymer may be especially remarkable.

In a case where two or more kinds of the same kind or different kinds of said olefin group rubber having different particle sizes respectively are used together, the physical properties of said thermoplastic resin is more improved so that the adding amount of said olefin group rubber graft polymer can be reduced.

Further, the reduced viscosity of toluene soluble component of said olefin group rubber graft polymer η sp/c (0.5 g/dl toluene solution at 30° C.) is preferably in the range between 0.30 to 1.00 g/dl and more preferably in the range between 0.50 to 0.80 g/dl.

Concretely, said olefin group rubber graft polymer may be styrene graft EPM and/or EPDM (St-g-EPM, St-g-EPDM, St-g-EPM-EPDM) which are that styrene is graft-polymerized with EPM and/or EPDM in the case of using for PS or HIPS, acrylonitrile-styrene graft EPM and/or EPDM (AnSt-g-EPM, AnSt-g-EPDM, AnSt-g-EPM-EPDM) which are that acrylonitorile and styrene are graft-polymerized with EPM and/or EPDM in the case of using for AS or ABS, styrene graft EBM and/or EBDM (St-g-EBM, St-g-EBDM, St-g-EBM-EBDM) which are that styrene is graft-polymerized with ethylene-butene rubber (EBM) and/or ethylene-butene-diene terpolymer (EBDM) in the case of using for PS, acrylonitrile-styrene graft EBM and/or EBDM (AnSt-g-EBM, AnSt-g-EBDM, AnSt-g-EBM-EBDM) which are that Acrylonitrile and styrene are graft-polymerized with EBM and/or EBDM in the case of using for AS or ABS.

In this invention, AS and AnSt-g-EPM mixed resin is described EPM-AS, AS and AnSt-g-EPDM mixed resin is described EPDM-AS, AS, AnSt-g-EPM and AnSt-g-EPDM mixed resin is described EPM-EPDM-AS, PS and St-g-EPM mixed resin is described EPM-PS, PS and St-g-EPDM mixed resin is described EPDM-PS, and, PS, St-g-EPM and St-g-EPDM mixed resin is described EPM-EPDM-PS.

(2) Graft Polymer for PPE Group Resin

PPE consists of structure unit having phenyl group as above described so that styrene graft olefin group rubber graft polymer such as St-g-EBM, St-g-EPDM St-g-EPM-EPDM, St-g-EBM St-g-EBDM, St-g-EBM-EBDM and the like are preferably selected. Said olefin group rubber graft polymer has styrene. polymer side chain having similar solubility parameter to PPE so that said olefin group rubber graft polymer has good compatibility with PPE group resin and said olefin group rubber graft polymer is mixed stably in said PPE group resin without separation to improve the equal quality recycling property of said PPE group resin.

In this invention, PPE and St-g-EPM (which is olefin type rubber graft polymer) mixed resin is described EPM-PPE, PPE and St-g-EPDM mixed resin is described EPDM-PPE, PPE, St-g-EPM and St-g-EPDM mixed resin is described EPM-EPDM-PPE, PS and EPM-PPE mixed resin is described EPM-PS-PPE, PS and EPDM-PPE mixed resin is described EPDM-PS-PPE, and, PS, St-g-EPDM and St-g-EPDM mixed resin is described EPM-EPDM-PS-PPE.

(3) Graft Polymer for Polyolefin Group Resin.

Since said olefin group rubber consists of the same or similar monomer as(to) monomer comprising said olefin group resin such as polyethylene, polypropylene, and the like, said olefin group rubber has substantially the same solubility parameter as said polyolefin group resin, especially polypropylene, so that said olefin group rubber has originally good compatibility with said polyolefin group resin and is used as said equal quality recycle aid agent without any treatment but said olefin group rubber graft polymers such as St-g-EPM, St-g-EPDM, AnSt-g-EPM, AnSt-g-EPDM and the like also has a good compatibility with said polyolefin group resin so that said olefin group rubber graft polymers can be used as said equal quality recycle aid agent to improve the physical properties of said polyolefin group resin.

B: Acrylic Rubber Graft Polymer

Said acrylic rubber used in the present invention may be such as acrylate homopolymer having alkyl group having 2 to 8 carbon atoms preferably, such as ethylacrylate, n-butylacrylate, 2-ethylhexylacrylate and the like, copolymer comprising two kinds and over of acrylate monomers mentioned above, copolymer comprising one or more kinds of acrylate monomer(s) mentioned above and butadiene or one or more kinds of other monomer(s) such as non-conjugated diene compounds which can be used for EPDM similarly, acrylonitrile, methylmethacrylate, vinyl acetate, styrene, ethylene, propylene and the like, copolymer comprising one or more kinds of acrylate monomer(s) and functional monomer(s) such as acrylic acid methacrylic acid, β-hydroxyethylmethacrylate, acrylamide, dimethylaminoethylmethacrylate and the like or polymerization silane coupling agent(s) such as γ-methacryloxypropyl-trimethoxysilane, vinyltriacetoxysilane, p-trimethoxysilyl-styrene, p-triethoxysilylstyrene, p-trimethoxysilyl-α-methylstyrene, p-triethoxysilyl-α-methylstyrene, γ-acryloxypropyltrimethoxysilane, vinyltrimethoxysilane, N-β (N-vinylbenzylaminoethyl-γ-aminopropyl) trimethoxysilane hydrochloride and the like.

As acrylic rubber for common use, copolymers, copolymerized with above mentioned functional monomer, such as polyethyl acrylate, poly n-butyl acrylate, n-butyl acrylate-acrylonitrile copolymer, n-butylacrylate-butadiene copolymer, n-butyl acrylate-ethylene copolymer, n-butyl acrylate-γ-methacryloxypropyltrimethoxysilane copolymer, n-butylacrylate-vinyltrimethoxysilane copolymer and the like may be used in this invention.

n-Butyl acrylate-butadiene copolymer having a mole ratio of n-butylacrylate/butadiene 30/70 and over is preferable to acrylic rubber.

Said acrylic rubber may be produced by suspension polymerization, emulsion polymerization, and the like.

Styrene group monomer(s) or styrene group monomer(s) and nitrile group monomer(s) are graft polymerized to said acrylic rubber to give said acrylic rubber compatibility with styrene group resin, PPE group resin and PC group resin the same as said olefin group rubber. To balance compatibility and degradation preventive effectiveness of impact strength in recycling, the content of said acrylic rubber may be preferably 10 to 80% by weight, more preferably 15 to 75% by weight and the content of said grafted monomer(s) (graft ratio) may be preferably 90~20% by weight, more preferably 55 to 25% by weight in all. In the case of styrene-nitrile graft acrylic rubber graft polymer, the content of styrene group monomer(s) may be preferably 5 to 95% by weight and the content of nitrile group monomer(s) may be preferably 95 to 5% by weight.

In above described range, compatibility of said acrylic rubber graft polymer with said thermoplastic resin and degradation preventive effectiveness of impact strength balance respectively.

C: Additive

In said molding thermoplastic resin material of the present invention, any additive may be added as long as said additive does not basin the equal quality recycling property and said additives may be such as pigment, dye, reinforcement ( e.g. glass fiber, carbon fiber and the like), filler (carbon black, silica, titanium oxide, talc etc.), heat resistance agent, antioxidant, antiozonant, weatherproof agent (UV absorber, light stabilizer), plasticizer, blowing agent, blowing aid agent, lubricant, slip agent, releasing agent mixed to resin, releasing agent, defogging agent, crystallization aid agent, flame retardant, flame retardant aid agent, fluidity improve agent, antistatic agent, compatibility aid agent and the like.

D: Blowing Agent

Said molding thermoplastic resin material of the present invention may be used for formed resin mold. To produce said formed resin mold, a mechanical blowing method in which inert gas such as nitrogen gas, carbon dioxide gas, rare gas and the like is blown into melted molding material with stirring, and a chemical blowing method in which blowing agent is added in melted molding material to decompose said blowing agent applied. To produce gas, a microcapsule method in which thermoplastic microcapsule encapsulating solvent having a low boiling point is added in melted molding material and said capsule is broken by heating to take out vapourized solvent is applied.

Said blowing agent used in said chemical blowing method includes inorganic blowing agent and, an organic blowing agent, and the inorganic blowing agent may be such carbonates as sodium hydrogen carbonate, sodium carbonate, potassium hydrogen carbonate, and the like or combination of two or more said carbonates or combination of said carbonate and inorganic or organic acid, or sodium boron hydrate, sodium nitrite, and the like, and organic blowing agent may be such as dinitropentamethylene naphthalene, 2,2'-azobisisobutylonitrile, hydroxycarbon amide, azodicarbon amide, alkaline metal salt thereof, alkaline earth metal salt thereof, p,p'-oxibis(benzenesulfonylhydrazide), p,p'-oxibis(benzenesulfonylsemicarbazide), N,N'-dimethyl-N, N'-dinitrosoterephthalamide, diazoaminobenzene, 1,1'-azobisformamide and the like.

Addition of Equal Quality Recycle Aid Agent

Said equal quality recycle aid agent of the present invention is commonly provided as powder, particles, or pellets and has thermoplasticity and itself can be used as the molding thermoplastic resin material. Generally, said equal quality recycle aid agent is added in said molding thermoplastic resin material in an amount between 1 to 80% by weight to improve the mechanical properties and the equal quality recycling property.

In the present invention said equal quality recycle agent and if desirable said additive is(are) added to prepare said molding thermoplastic resin material. The blending method applied in this invention may be a physical blending method such as melting blending, solvent cast blending, latex blending, polymer complex and chemical blending method such as solution graft, interpenetrating polymer network to form polymer alloy and said melting blending is especially preferable. To mix said molding material, a little amount of solvent can be used if desirable. As mixing machine to mix said molding material, a tumbler, a Henschel mixer, a rotary mixer, a super mixer, a ribbon blender, a V-blender and the like may be used and each component in said molding material is uniformly dispersed by said mixing machines.

A resulting mixture prepared as above described is melted and mixed and then palletized. For palletizing a multi-screw-extruder is generally used and besides said multi-screw-extruder, a Banbury mixer, a roller, a Ko-kneader, a blast mill, a Brabender plastograph, and the like can be used and said mixing machines may be operated in batch or continuously.

Further, mold blend in which said resin pellet, said equal quality recycle aid agent, and other additive(s) are mixed without melting and the resulting mixture is put into a heating cylinder of the molding machine as the molding material and said mixture is melted and mixed in said cylinder also can be applied in the present invention.

Mold

Mold produced by using said molding material of the present invention contains said equal quality recycle aid agent so that said mold is used as car parts, parts of transportation machines, parts or cabinets of offices machines or electrical appliances, stationery, toys sheets or film used as seals or labels, said mold has substantially equal quality to the mold using virgin molding materials.

Common molding method of thermoplastic resin can be applied in the present invention. Said molding method may be such as an injection molding method including a standard injection molding (Said molding) method and a gas-assist molding method ($H^2M$, GPI, RFM etc), an expansion molding method, a sandwich molding method, a two layers molding method, a multi layers molding method, a multi color molding method, a tandem molding method, a SP molding method, a vacuum forming method, a pressure forming method, an extrusion molding method, a profile extrusion molding method, a blow molding method, a rotation molding method, a transfer molding method, a compression molding method, a calendar roll molding method, an inflation molding method, a lamination molding method, an injection-compression molding method, blow molding method, monofilament molding method, a casting method, a powder molding method, a press molding method, and the like. Especially, in an injection molding gas assist molding method or an expansion molding method is preferable since mold showing little warp and deformation and uniform shrinkage percentage and having high dimension stability can be molded by said molding method. Further, in said molding method, recycled materials have equal shrinkage percentage to virgin materials.

Paint Coating

Paint coating and paint are described below.

Resin mold is commonly colored in various colors and said color of said resin mold may change and become dirty while using for a long time, so that if said discarded resin mold is recycled as it is, recycled resin mold having undesirable appearance with confused colors, changed colors, or dirt may be made.

In international publication No WO9738838, a resin mold is coated with a paint having compatibility with said resin mold for equal quality recycling.

When a resin mold relating to the present invention is coated with a paint having compatibility with the molding thermoplastic resin material of said resin mold, said resin mold can be shattered and pelletized without separating said paint film. In the case of styrene group resin mold, thermoplastic resin used for said paint may be styrene modified acrylic resin, acrylic resin, thermoplastic resin of said resin mold itself, said equal quality recycle aid agent of the present invention and the like.

Said paint may be provided in emulsion type, dispersion type, or water solution type, and power type.

Except resins mentioned above, pigment, dye, surface conditioner, solvent, plasticizer, antifoaming agent, color separating proof agent, mottled proof agent, floating proof agent, surface active agent, skinning proof agent, thickener, sedimentation, antisagging agent, antiseptic, antifungal agent, UV absorber, flame retardant, stain-proofing agent, flatting agent and the like may be added as paint.

Ink is also used in the present invention and said ink has similar composition to the paint and said ink may include solution type, emulsion type, suspension type, water-soluble type, bis-solid type, non-solvent type, powder type and the like. When a resin mold coated with said ink is recycled with said ink film, the resin of said ink has preferably compatibility with said molding thermoplastic resin material of said resin mold and said resin used in said ink may be almost the same as the resin used in said paint.

Recovery of Physical Properties and a Recycle Aid Agent

When a resin mold of said styrene group resin such as EPM-AS, EPDM-PS, and the like or modified PPE group resin, which is coated with a paint or an ink containing a thermoplastic resin having compatibility with said thermoplastic resin of said resin mold, is shattered to recycle or shattered and palletized to recycle repeatedly without separating said paint film or said ink film, content of pigment or dyestuff in said molding thermoplastic resin material for equal quality recycling may generally increase to degrade its mechanical strength(especially impact strength). To recover said degrading mechanical strength, it is desirable to add said equal quality recycle aid agent to said molding thermoplastic resin material as a recycle aid agent in each recycle.

Adding method of said recycle aid agent may include (1) adding said recycle aid agent to shattered resin mold to blend, (2) palletizing a mixture of said shattered resin mold and said recycle aid agent by heating and melting said mixture by using the extruder, (3) blending pellets of recycled resin, which is prepared by heating and melting said shattered resin mold by using the extruder and further pelletized, and said recycle aid agent, (4) repelletizing a mixture of said pellets of recycled resin, and said recycle aid agent by heating and melting by using the extruder, (5) blending said repelletized mixture and said shattered resin mold and said recycle aid agent, and the like.

Effect of the Invention

Said equal quality recycle aid agent of the present invention has thermal stability, heat resistance, and durability and further contains the olefin group rubber and the acrylic rubber having a great effect to improve the impact strength on said molding thermoplastic resin material as a base component and still further contains a graft chain graft polymerized to said rubber like material having compatibility with said molding thermoplastic resin material so that said equal quality recycle aid agent is mixed uniformly in said thermoplastic resin without separating to improve the equal quality recycling property, namely the mechanical properties (impact strength) which is degraded by recycling. Accordingly said thermoplastic resin in which said equal quality recycle aid agent maintains equally practical impact strength and can be used as a material of mold having equal quality and value to original mold, namely can be used as an equal quality and value molding material.

EXAMPLE 1

Study of the Equal Quality Recycle Aid Agent

Comparison sample A was an acrylonitrle-styrene copolymer AS (Kralastic K-1158 Sumitomo Chemical Co., Ltd.) and Comparison sample B was ABS resin in which AnSt-g-BD was mixed in AS in a weight ratio of 85/15 wherein An and St were graft polymerized to a butadiene rubber to prepare said AnSt-g-BD (An/St=about 25/75 weight ratio, graft ratio 40% by weight, average particle size of rubber 0.4 $\mu$m).

Sample A was prepared by mixing AnSt-g-ACM-BD in said AS in a weight ratio of 85/15 wherein An and St were graft-polymerized to an acrylic rubber to prepare said AnSt-g-ACM-BD (An/St=25/75 weight ratio, graft ratio 50% by weight).

Sample B was prepared by mixing AnSt-g-EPM in said AS in a weight ratio of 85/15 wherein An and St were graft-polymerized to an EPM (E/P=75/25 molar ratio, Mooney Viscosity (ML$_{1+4}$, 100° C.) 50) to prepare said AnSt-g-EPM (An/EPM/St=about 23/22/55 weight ratio, graft ratio 78% by weight, average particle size of rubber 1 to 1.5 $\mu$m).

Sample C was prepared by mixing AnSt-g-EPDM (1), in said AS in a weight ratio of 80/20 wherein An and St were graft-p olymerized to an EPDM (F/P/DCP=65/25/10 molar ratio Mooney Viscosity (ML$_{1+4}$, 100° C.) 80, average particle size of rubber about 1 $\mu$m) to prepare said AnSt-g-EPDM(1) (An/FPDM/St=about 23/29/48 weight ratio, graft-ratio 71% by weight).

Sample D was prepared by mixing AnSt-g-EPDM(2) in said AS in a weight ratio of 80/20 wherein An and St were graft-polymerized to an EPDM (E/P/DCP=80/20/5 molar ratio, Mooney Viscosity (ML$_{1+4}$, 100° C.) 25, average particle size of rubber=about 1 $\mu$m) to prepare said AnSt-g-EPDM(2) (An/EPDM/St=about 23/14/63 weight ratio, graft ratio 86% by weight).

Said samples were heated at 250° C. in a heating cylinder of a injection molding machine respectively and IZOD impact strength was determined as for purge samples (immediately purged without a stay in the heating cylinder), a 0.5 hour stay sample (purged after 0.5 hours stay in the heating cylinder), and a one hour stay sample (purged after a one hour stay sample). To prepare test pieces to determine impact strength each melted sample was purged into the cold water to harden and then said hardened 1 sample was dried and shatterd. The resulting shattered sample was molded to prepare the test piece.

The results are shown in Table 1.

TABLE 1

| Heating and melting time | Comparison sample A | Comparison Sample B | Sample A | Sample B | Sample C | Sample D |
| --- | --- | --- | --- | --- | --- | --- |
| Virgin sample | 11.1* | 20.3 | 29.5 | 41.5 | 51.8 | 39 |
| Purge product | 10.9* | 11.8 | 28.2 | 40.5 | 48.1 | 38.2 |
| 0.5 hr. stay | 11.3* | 11.4 | 23.7 | n.d. | n.d. | 40.8 |
| 1.0 hr. stay | 11.6* | 9.2 | 22.7 | 36.5 | 44.4 | 39.6 |
| Decline ratio of impact strength (1.0 hr. stay) | 104.5% | 45% | 77% | 88% | 86% | 101.5% |

Based upon ASTM-D256.
Unit: kg-cm/cm
*: Without notch
n.d.: No data

Referring to Table 1, it may be clear that the comparison sample B in which butadiene rubber graft polymer AnSt-g-PB is mixed in AS shows larger degradation of impact strength and has lower heat resistance than the samples A, B, C and D in which AnSt-g-ACM-PB, AnSt-g-EPM, AnSt-g-EPDM (1) and (2) were respectively mixed as said equal quality recycle aid agent of the present invention, so that the samples A, B, C and D of the present invention have excellent equal quality recycling property and can be used as molding resin materials for mold having equal quality and value to the original mold. Especially, sample D in which AnSt-g-EPDM (2) using EPDM having a high E/P ratio and low Mooney Viscosity and further a high graft ratio was mixed as the equal quality recycle aid agent shows lower degradation of impact strength comparing with the samples A, B and C. In the samples A, B, C and D, 70% and over of impact strength after heating at 250° C., for one hour (corresponding to heat stress of 20 times and over repeated recycles) is guaranteed.

Supplementary Test of Example 1

In EXAMPLE 1, since difference of thermal stability between the samples B, C, and D were recognized, observation by TEM about said three samples was carried out. As a result, it was recognized that in the sample B using AnSt-g-EPM disperses like salami sausage in a large particle size of 1 μm so that a small defect of compatibility was recognized, in the sample C using AnSt-g-EPDM(1), tendency of agglutination by adhesion of melting particles of AnSt-g-EPDM mutually was recognized and in sample D using AnSt-g-EPDM(2) having a high graft ratio, it is recognized that the particle size of AnSt-g-EPDM was smaller than that in the sample C.

Accordingly, it seems that the EPDM group graft polymer has better dispersibility in AS than the EPM group graft polymer and further 15% by weight addition of the EPDM group graft polymer shows better dispersibility in AS than 20% by weight addition of the EPDM group graft polymer and better dispersibility gives better equal quality recycling property.

Comparison Test 1

(1) Mooney Viscosity of EPDM

Samples D-1 and D-2 having the same composition as the sample D respectively were prepared by using two kinds of AnSt-g-EPDM, one contains EPDM having a Mooney viscosity ($ML_{1+4}$, 100° C.) of 145 and the other contains EPDM having a Mooney viscosity ($ML_{1+4}$, 100° C.) of 160. Said samples D-1 and D-2 were heated and melted in the heating cylinder of the injection molding machine at 250° C. and stayed in said heating cylinder for one hour respectively and then purged. IZOD impact strength was determined as for each sample purged from said heating cylinder and the results are shown in Table 2.

TABLE 2

| | IZOD impact strength (kg-cm/cm) | | |
|---|---|---|---|
| | Virgin sample | 1.0 hr. stay sample | Ratio (%) |
| Sample D-1 | 38.1 | 35.0 | 91.9 |
| Sample D-2 | 38.2 | 30.5 | 79.8 |

Referring to Table 2, it is recognized that degradation of impact strength of the sample D-1 containing EPDM having a Mooney viscosity of 145 is much smaller than that of the sample D-2 containing EPDM having a Mooney viscosity of 160 and in the sample D-2, 80% and over of original impact strength can not be maintained after recycling.

Accordingly, to secure good equal quality recycle property, lower Mooney viscosity of EPDM used in the equal quality recycle aid agent is preferable and Mooney viscosity lower than 150 gives enough improvement effect of the equal quality recycle property.

(2) Ratio of E/P in EPDM

Samples D-3 and D-4 having the same composition as AnSt-g-EPDM (2) respectively were prepared by using two kinds of AnSt-g-EPDM, one contains EPDM whose E/P molar ratio is 65/35 and the other contains EPDM whose E/P molar ratio is 55/45. Said samples D-1 and D-2 were heated and melted in the heating cylinder of the injection molding machine at 250° C. and stayed in said heating cylinder for one hour respectively and then purged. IZOD impact strength was determined as for each sample purged from said heating cylinder and the results are shown in Table 3.

TABLE 3

| | IZOD impact strength (kg-cm/cm) | | |
|---|---|---|---|
| | Virgin sample | 1.0 hr. stay sample | Ratio (%) |
| Sample D-3 | 37.8 | 33.4 | 88.4 |
| Sample D-4 | 36.4 | 27.6 | 75.7 |

Referring to Table 3, it is recognized that degradation of impact strength of the sample D-3 containing EPDM whose E/P molar ratio is 65/35 is much smaller than that of the sample D-4 containing EPDM whose E/P molar ratio is 55/45 and in the sample D-4, 80% and over of original impact strength can not be maintained after recycling.

Accordingly, to secure good equal quality recycling property larger E/P molar ratio of EPDM (ethylene rich) is preferable and E/P molar ratio 60/40 and over gives sufficient improvement effect on the equal quality recycling property.

(3) Graft Ratio

Samples D-5 and D-6 having the same component as AnSt-g-EPDM (2) respectively were prepared by using two kinds of AnSt-g-EPDM, one has graft ratio of 23% by weight and the other has graft ratio of 17% by weight. Said samples D-5 and D-6 were heated and melted in the heating cylinder of the injection molding machine at 250° C. and stayed in said heating cylinder for one hour respectively and then purged. IZOD impact strength was determined as for each sample purged from said heating cylinder and the results are shown in Table 4.

TABLE 4

| | IZOD impact strength (kg-cm/cm) | | |
|---|---|---|---|
| | Virgin sample | 1.0 hr. stay sample | Ratio (%) |
| Sample D-5 | 38.8 | 34.5 | 88.9 |
| Sample D-6 | 34.4 | 25.0 | 72.7 |

Referring to Table 4, the sample D-5 containing AnSt-g-EPDM whose graft ratio is 23% by weight shows much smaller degradation of impact strength than that of the sample D-6 whose graft ratio is 17% by weight and in sample D-6, 80% and over of original impact strength can not be maintained after recycling.

Accordingly, to secure good equal quality recycling property, a higher graft ratio is preferable and a graft ratio 20% and over gives sufficient improvement effect on the equal quality recycling property.

EXAMPLE 2

Results of Estimation Test of the Equal Quality Recycling Property No. 1

Thermoplastic resin compounds having following compositions were prepared.

| | |
|---|---|
| Compound No. 1 | AS/AnSt-g-EPDM (3) = 80/20 |
| Compound No. 2 | PS/St-g-EPDM = 75/25 |
| Compound No. 3 | PS/PPS/St-g-EPDM = 37.5/50/12.5 |

Said AnSt-g-EPDM (3) contains EPDM whose E/P/DCP. Molar ratio is 70/25/5. Mooney viscosity ($ML_{1+4}$, 100° C.) is 100. An/St weight ratio is about 25/5 and graft ratio is 45% by weight.

Said St-g-EPDM contains EPDM whose E/P/DCP molar ratio is 65/25/5. Mooney viscosity ($ML_{1+4}$, 100° C.) is 60, average particle size of rubber is 1 μm, rubber content 38% by weight and graft ratio is 50% by weight.

Using each compound, box type molds (electronic printer cabinets) having length of 500mm, width of 500mm, height of 30mm, wall thickness of 3mm, was produced. The molds were shattered, pelletized and remolded. Said processes were repeated in 3 turns and physical properties were determined in each turn and the results are shown in Table 7.

Further, each mold in each turn was coated by using a paint whose composition is shown in Table 5 and a thinner whose composition is shown in Table 6, and each coated mold (thickness of paint film is 15 μm) was shattered, pelletized, and molded without separating paint film and the results of change of IZOD impact strength of each mold by 3 turn recycles are also shown in Table 7.

TABLE 5

Paint combination

| No. | Materials | Combination amount (wt %) |
|---|---|---|
| 1 | Styrene modified acrylic resin varnish | 50 |
| 2 | Titanium oxide | 16 |
| 3 | Calcium carbonate | 5 |
| 4 | Talc | 5 |
| 5 | Ethyl acetate | 8 |
| 6 | Methyl isobutylketone | 8 |
| 7 | Isobutanol | 7.7 |
| 8 | Additive (Surface conditioner) | 0.3 |

No. 1, styrene modified acrylic resin varnish, was purchased from DAINIPPON AND INK CHEMICALS INCORPORATED, whose name was ACRYLDIC 56-1155, wherein styrene modified acrylic resin vanish has compatibility with ABS, HIPS, modified PPE..

TABLE 6

Diluent composition

| No. | Materials | Combination amount (wt %) |
|---|---|---|
| 1 | Ethyl acetate | 40 |
| 2 | Isobutanol | 25 |
| 3 | Diacetone alcohol | 20 |
| 4 | Butyl cellosolve | 15 |

TABLE 7

| Evaluation items | Unit | Sample 1/no paint | | | | Sample 2/no paint | | | | Sample 3/no paint | | | |
|---|---|---|---|---|---|---|---|---|---|---|---|---|---|
| | | Virgin sample | 1 Turn | 2 Turn | 3 Turn | Virgin sample | 1 Turn | 2 Turn | 3 Turn | Virgin sample | 1 Turn | 2 Turn | 3 Turn |
| Heat properties | | | | | | | | | | | | | |
| Deflection temperature under load (18.6 kg weight) | ° C. | 86.1 | 86.2 | 86.7 | 87.7 | 85.0 | 85.6 | 85.9 | 85.5 | 87.7 | 89.6 | 90.4 | 89.7 |
| Mechanical properties | | | | | | | | | | | | | |
| Breaking point strength | kg/cm² | 489.6 | 492.2 | 493.5 | 469.4 | 222.5 | 229.2 | 239.0 | 242.9 | 468 | 473 | 479 | 508 |
| Tensile breaking point strength | % | 16.6 | 15.3 | 15.4 | 14.8 | 72.1 | 39.6 | 47.2 | 47.3 | 35.0 | 34.4 | 41.2 | 36.7 |
| Bending yield point strength | kg/cm² | 760.6 | 767.7 | 765.3 | 765.2 | 340.5 | 339.5 | 338.6 | 342.2 | 755 | 778 | 788 | 787 |
| Bending elasticity | kg/cm² | 27600 | 27600 | 27500 | 27800 | 20399 | 20760 | 20861 | 20907 | 22200 | 22600 | 22900 | 22600 |
| IZOD impact strength | kg-cm/cm | 18.8 | 18.8 | 18.7 | 18.9 | 6.5 | 6.4 | 6.5 | 6.9 | 13.3 | 13.3 | 13 | 13.1 |
| Other | | | | | | | | | | | | | |
| Weatherproof | Color difference ΔE | 0.3 | 0.3 | 0.4 | 0.3 | 0.4 | 0.3 | 0.3 | 0.3 | n.d. | n.d. | n.d. | n.d. |
| Decline ratio of IZOD impact strength (%) | | — | 0 | 0.05 | +1 | — | 1.5 | 0 | +6 | — | 0 | 2 | 1.5 |

TABLE 7-continued

| | | Sample 1/paint | | | | Sample 2/paint | | | | Sample 3/paint | | | |
|---|---|---|---|---|---|---|---|---|---|---|---|---|---|
| Evaluation items | Unit | Virgin sample | 1 Turn | 2 Turn | 3 Turn | Virgin sample | 1 Turn | 2 Turn | 3 Turn | Virgin sample | 1 Turn | 2 Turn | 3 Turn |
| Mechanical properties | | | | | | | | | | | | | |
| IZOD impact strength | kg-cm/cm | 18.8 | 17.4 | 16 | 15.1 | 6.5 | 6.3 | 6.1 | 6.3 | 13.1 | 12.7 | 12.0 | 11.9 |

Methods of measurement: each methods were based on
Deflection temperature under load: ASTM-D468 Breaking point strength: ASTM-D638 Tensile breaking point strength: ASTM-D638
Bending yield point strength: ASTM-D790 Bending elasticity: ASTM-D790 IZOD impact strength: ASTM-D256

In compound No. 2 of this example, a little improvement of impact strength was recognized and the reason for said improvement seems to be owing to the improvement of compatibility of St-g-EPDM by phase transition in which EPDM is arranged outside and a St graft chain is arranged inside by heat and pressure in an extruder.

Referring to Table 7, it is recognized that the physical properties of the resin shows little degradation without coating upon repeated recycles while in a case where the mold was coated, impact strength of the resin shows a little degradation by mixing pigment of paint in the resin comparing the mold without coating.

Further, adhesiveness of paint film to the mold was estimated in each turn in Table 8 and adhesiveness of paint film was good in each turn as shown in Table 8.

TABLE 8

| Evaluation items | Test and its condition | Judgment items | Sample 5 to 25 |
|---|---|---|---|
| Adhesiveness | Peeling test at cross scored portion (1 mm × 1 mm, 100 portion) | 100/100 | 100/100 |
| Pencil hardness | MITSUBISHI ENPITSU UNI, 5 N load (500 gr), at 45° surface | Harder than HB | F |
| Impact strength | Du Pont test ½φ 500 gr | Not abnormal about appearance and adhesiveness | Acceptance |
| Moisture resistance | 40° C., 90% in RH, 120 hr. | Not abnormal about appearance and adhesiveness | Acceptance 100/100 |
| Alkali resistance | 40° C., 90% in RH, 120 hr. After coating KAOH SEKKEN MY PET 5% aqueous solution | Not abnormal about appearance and adhesiveness | Acceptance 100/100 |
| Heat resistance | 60° C., 120 hr. Left | Not abnormal about appearance and adhesiveness | Acceptance 100/100 |
| Temperature cycle resistance | 60° C. to 20° C. each 3 hr., 10 cycles as moving 30 min. 1 cycle | Not abnormal about appearance and adhesiveness | Acceptance 100/100 |
| Warm waterproof | Impregnated 40° C., 120 hr. | Not abnormal about appearance and adhesiveness | Acceptance 100/100 |

Sample 5: Compound No. 1
Sample 6: Compound No. 2

-continued

Sample 7: Compound No. 3
Sample 8: Mold using recycled pellets of sample 5 (Compound No. 1) in one turn recycle
Sample 9: Mold using recycled pellets of sample 5 (Compound No. 1) in two turn recycle
Sample 10: Mold using recycled pellets of sample 5 (Compound No. 1) in three turn recycle
Sample 11: Mold using recycled pellets of sample 6 (Compound No. 2) in one turn recycle
Sample 12: Mold using recycled pellets of sample 6 (Compound No. 2) in two turn recycle
Sample 13: Mold using recycled pellets of sample 6 (Compound No. 2) in three turn recycle
Sample 14: Mold using recycled pellets of sample 7 (Compound No. 3) in one turn recycle
Sample 15: Mold using recycled pellets of sample 7 (Compound No. 3) in two turn recycle
Sample 16: Mold using recycled pellets of sample 7 (Compound No. 3) in three turn recycle
Sample 17: Mold using recycled pellets of coated mold of sample 5 (Compound No. 1) in one turn recycle
Sample 18: Mold using recycled pellets of coated mold of sample 5 (Compound No. 1) in two turn recycle
Sample 19: Mold using recycled pellets of coated mold of sample 5 (Compound No. 1) in three turn recycle
Sample 20: Mold using recycled pellets of coated mold of sample 6 (Compound No. 2) in one turn recycle
Sample 21: Mold using recycled pellets of coated mold of sample 6 (Compound No. 2) in two turn recycle
Sample 22: Mold using recycled pellets of coated mold of sample 6 (Compound No. 2) in three turn recycle
Sample 23: Mold using recycled pellets of coated mold of sample 7 (Compound No. 3) in one turn recycle
Sample 24: Mold using recycled pellets of coated mold of sample 7 (Compound No. 3) in two turn recycle
Sample 25: Mold using recycled pellets of coated mold of sample 7 (Compound No. 3) in three turn recycle

EXAMPLE 3

Recovery of the Physical Property Degraded by Contamination of Paint Film

AnSt-g-EPDM (2), the equal quality recycle aid agent used in Sample D of EXAMPLE 1, and St-g-EPDM, the equal quality recycle aid agent used in Compound No.2 of EXAMPLE 2, were respectively added in each pellet in one turn, two turns, and three turns shown in Table 7 to recover impact strength, impact strength of each pellet was degraded by mixing pigment and the like in paint.

Test-pieces were molded by using the resulting mixture to determine IZOD impact strength according to ASTM-D256. The results are shown in Table 9.

TABLE 9

| Additive amount of recycle aid agent (wt %) | Sample 1/paint *1 | | | Sample 2/paint *2 | | | Sample 3/paint *2 | | |
|---|---|---|---|---|---|---|---|---|---|
| | 1 Turn | 2 Turn | 3 Turn | 1 Turn | 2 Turn | 3 Turn | 1 Turn | 2 Turn | 3 Turn |
| 1 | 18.4 | 17.0 | 15.5 | 6.9 | 6.2 | 6.3 | 12.9 | 12.5 | 12.2 |
| 3 | 20.3 | 19.0 | 17.7 | 7.3 | 7.2 | 7.1 | 14.5 | 14.3 | 12.4 |
| 5 | 21.6 | 20.9 | 18.7 | 7.7 | 7.5 | 7.7 | 16.8 | 15.7 | 14.2 |
| 7 | — | 21.5 | 19.8 | 8.2 | — | 7.9 | 17.6 | 18.0 | 16.5 |
| 9 | — | — | 20.8 | 8.9 | — | 8.7 | 20.1 | 19.7 | 17.7 |

Unit: kg-cm
*1: As recycle aid agent. AnSt-g-EPDM (2) was used.
*2: As recycle aid agent, St-g-EPDM (1) was used.

Referring to Table 9, it is confirmed that impact strength degraded by contamination of paint film can be recovered by adding the equal quality recycle aid agent such as AnSt-g-EPSM, St-g-EPDM and the like. Further, no faults in molding such as scorch, silver streak, and the like caused by contamination of said paint film and said recycle aid agent were recognized.

EXAMPLE 4

Recycle of Discarded Foamed Resin Mold Foamed polystyrene was heated to shrink and pelletized. 75 parts by weight of the resulting pellet of recycled PS and 25 parts by weight of compound No.2 St-g-EPDM were mixed together by the same process as used in EXAMPLE 2 to prepare a mixed resin pellet. Test piece for IZOD impact strength test was molded by using said mixed resin pellet and IZOD impact strength was determined. The result of said determination was 5.5 kg-cm/cm.

75 parts by weight of said pellet of recycled PS and 25 parts by weight of St-g-BD (graft ratio 50% by weight, rubber content 50% by weight) were mixed together and pelletized by the same process as used in EXAMPLE 2 as comparison. IZOD impact strength of the resulting recycled resin pellet was 5.3 kg-cm/cm.

This example relates to foamed polystyrene and besides this, modified PPE group resin mold in which foamed polystyrene is combined to said PPE group resin mold to give heat insulation property and sound-proof property, thermoplastic resin mold in which foamed polystyrene is combined to said thermoplastic resin mold such as blow molded product of HIPS laminated with foamed polystyrene, and the like can be shattered and palletized without separating to each material and the equal quality recycle aid agent can be added to said recycled resin pellet.

EXAMPLE 5

Mold Blend 90 parts by weight of AnSt-g-EPDM (2) and 10 parts by weight of titanium oxide were mixed together and the resulting mixture was pelletized by the same process as used in EXAMPLE 2 to prepare master batch A. A mixture of said master batch A, AS resin, and AnSt-g-EPDM (2), 5/80/15 weight ratio, was prepared and pelletized to estimate possibility of mold blend by molding resulting pellets by using an injection molding machine.

As a result, dispersing of pigment (titanium oxide) and AnSt-g-EPDM (2) was sufficient and no color spot was recognized. Further, no faults in molding such as scorch, silver streak, and the like caused by mixing these materials were recognized.

In this example, the case that AnSt-g-EPDM (2) and AS resin were used was illustrated and besides this, a mold blend of St-g-EPDM and PS resin or PPE group resin or PC group resin is also applied in the present invention.

EXAMPLE 6

Acrylic Rubber Equal Quality Recycle Aid Agent

An and St were graft polymerized to an acrylic rubber consisting of a n-butyl acrylate-butadiene copolymer (n-butyl acrylate/butadiene=50/50 molar ratio) at a weight ratio 25/75 (An/St) to prepare an equal quality recycle aid agent AnSt-g-ACM-BD (graft ratio 50% by weight). Said AnSt-g-ACM-BD was mixed in AS resin at an amount of 15% by weight to prepare a compound No.4. Recycle test the same as applied in EXAMPLE 2 about said compound No. 4 was carried out and the results are shown in Table 10.

TABLE 10

| Evaluation items | Methods of measurement | Unit | Virgin sample | Sample/no paint | | |
|---|---|---|---|---|---|---|
| | | | | 1 Turn | 2 Turn | 3 Turn |
| Heat property | | | | | | |
| Deflection temperature under load (18.6 kg weight) | ASTM-D468 | ° C. | 82.8 | 84.4 | 85.3 | 84.5 |
| Mechanical properties | | | | | | |
| Breaking point strength | ASTM-D638 | kg/cm² | 305 | 306 | 306 | 303 |
| Tensile breaking point strength | ASTM-D638 | % | 89 | 85 | 89 | 85 |
| Bending yield point strength | ASTM-D790 | kg/cm² | 442 | 441 | 441 | 436 |
| Bending elasticity | ASTM-D790 | kg/cm² | 13200 | 13300 | 13000 | 13300 |
| IZOD impact strength | ASTM-D256 | kg-cm/cm | 32.4 | 32.4 | 30.5 | 29.3 |
| Other | | | | | | |
| Weatherproof | FOM 120 hr Irradiation | Color difference Δ E | 1.2 | 1.2 | 1.3 | 0.9 |
| Decline ratio of IZOD impact strength (%) | | | — | 5.3 | 5.9 | 3.9 |

Referring to the results in Table 10, it is confirmed that AS resin whose equal quality recycling property was improved by AnSt-g-ACM-BD has excellent thermal stability showing small degradation of the physical properties by repeated recycles and the degradation rate of impact strength in each turn of recycle attains not more than 10% (90% and over of impact strength of the original resin mold) so that said compound can be used as the material for the resin mold having equal quality and value to the original rein mold.

Comparisob Test 2

(1) BA/BD Ratio

AnSt-g-ACM-BD having the same composition as used in EXAMPLE 6 was prepared by using an acrylic rubber containing n-butyl acrylate (BA) and butadiene (BD) at a molar ratio 25/75 (a graft ratio 50% by weight) and a compound No.4-1 having the same composition as the compound No. 4 was prepared by using said equal quality recycle aid agent. By using said equal quality recycle aid agent, a recycle test the same as EXAMPLE 2 was carried out and the results are shown in Table 11.

TABLE 11

| | IZOD impact strength (kg-cm/cm) | | | |
|---|---|---|---|---|
| | Virgin sample | 1 Turn | 2 Turn | 3 Turn |
| Sample 4-1 | 34.8 | 31.0 | 27.3 | 24.1 |
| Decline ratio (%) | — | 11 | 12 | 11.7 |

Referring to Table 11, degradation of impact strength of the compound No.4-1 in each turn of recycle is larger than the compound No.4 and degradation rate of impact strength in each turn of recycle can not attain not more than 10% (90% and over of impact strength of the original resin mold). A molar ratio BA/BD larger than 35/65 is preferable to secure good improvement effect of equal quality recycling property.

(2) Graft Ratio

Compounds No.4-2 and No.4-3 having the same composition as used in EXAMPLE 6 respectively were prepared by using two kinds of acrylic rubbers, one has a graft ratio 23% by weight and the other has a graft ratio 18% by weight. A recycle test same as EXAMPLE 2 was carried out by using said compounds No.4-2 and No.4-3 and the results are shown in Table 12.

TABLE 12

| | IZOD impact strength (kg-cm/cm) | | | |
|---|---|---|---|---|
| | Virgin sample | 1 Turn | 2 Turn | 3 Turn |
| Sample 4-2 | 33.8 | 31.8 | 29.8 | 28.0 |
| Decline ratio (%) | — | 59 | 6.3 | 6.0 |
| Sample 4-3 | 32.4 | 28.4 | 24.7 | 21.9 |
| Decline ratio (%) | — | 12.4 | 13.0 | 11.3 |

Referring to Table 12, it is recognized that the compound No. 4-3 using AnSt-g-ACM-BD whose graft ratio is 18% by weight shows larger degradation rate of impact strength in each turn than the compound No.4-2 whose graft ratio is 23% and degradation rate of impact strength in each turn of recycle can not attain not more than 10% (90% and over of impact strength of the original resin mold). A graft ratio 20% and over by weight is preferable to secure good improvement effect of equal quality recycling property.

EXAMPLE 7

Results of an Estimation Test of Equal Quality Recycle Property; No. 2

Using sample A, recycle test same as EXAMPLE 2 was carried out and the results are shown in Table 13.

TABLE 13

| Evaluation items | Methods of measurement | Unit | Sample/no paint | | | |
|---|---|---|---|---|---|---|
| | | | Virgin sample | 1 Turn | 2 Turn | 3 Turn |
| Heat property | | | | | | |
| Deflection temperature under load (18.6 kg weight) | ASTM-D468 | °C. | 85.5 | 85.5 | 85.3 | 85.5 |
| Mechanical properties | | | | | | |
| Breaking point strength | ASTM-D638 | kg/cm$^2$ | 328 | 331 | 333 | 330 |
| Tensile breaking point strength | ASTM-D638 | % | 14 | 12 | 15 | 14 |
| Bending yield point strength | ASTM-D790 | kg/cm$^2$ | 482 | 488 | 491 | 488 |
| Bending elasticity | ASTM-D790 | kg/cm$^2$ | 16400 | 16500 | 16500 | 16300 |
| IZOD impact strength | ASTM-D256 | kg-cm/cm | 36.3 | 34.6 | 33.2 | 31.8 |
| Decline ratio of IZOD (%) | | | — | 4.7 | 4.0 | 4.0 |

Referring to the results of Table 13, AS resin whose equal quality recycling property is improved by AnSt-g-ACM-BD has excellent heat-resistance and degradation rate of impact strength in each turn of recycle can attain not more than 10% (90% and over of impact strength of the original resin mold and can be used as the resin material for the resin mold having equal quality to the original resin mold.

EXAMPLE 8

Improvement of PP Resin

Polypropylene resin (Sumitomo Kagaku Kogyo Co. Sumitomo Nobulene Z114A, Natural color) and EPDM used in graft polymer sample D of EXAMPLE 1 were mixed together at a weight ratio 80/20 in a kneader at 160° C. for 20 minutes and then the resulting mixture was molded in a sheet-shape by the calender. The resulting sheet was cooled and cut into square pellets.

IZOD impact strength of said resin mixture was 30.0 kg-cm/cm while IZOD impact strength of Z114A was 6.9 kg-cm/cm, so that impact strength was much improved by adding said EPDM in said resin mixture.

EXAMPLE 9

Improvement of ABS, HIPS

IZOD impact strength of a resin mixture of sample B of EXAMPLE 1 and sample D of EXAMPLE 1 (50/50 weight ratio) was 32.3 kg-cm/cm and heat-resistance test of said resin mixture, the same method as described in EXAMPLE 1, was carried out. As a results, it was recognized that impact strength of said resin mixture degraded to 21.1 kg-cm/cm and degradation of the mechanical strength was recognized but said degradation was less than sample B of EXAMPLE 1.

As above described, improvement effect of thermal stability by adding said equal quality recycle aid agent in the resin compound having poor thermal stability was recognized.

Like wise, it was confirmed that heat-resistance (IZOD impact strength) of HIPS resin (Polystyrene 403R: Natural color: A & M Styrene Co.) was 8.0 kg-cm/cm for unheated resin, 3.2 kg-cm/cm after heating at 250° C. for one hour, in the case of a resin mixture of Polystyrene 403R and compound No.2, the composition ratio of which was 50/50 by weight, the heat-resistance (IZOD impact strength) was 8.9 kg-cm/cm before heating and 5.6 kg-cm/cm after heating, in the case of compound No.2 and PS as main component of Polystyrene 403, R heat-resistance (IZOD impact strength) was 11.8 kg-cm/cm (without notch) before heating and 11.7 kg-cm/cm (without notch).

What is claimed is:

1. A thermoplastic resin composition for molding which is withdrawn from discarded thermoplastic resin mold mode of a thermoplastic resin composition essentially consisting of thermoplastic resin and grafted olefin rubber and/or grafted acrylic rubber having graft polymer chains which have compatibility with said thermoplastic resin wherein said grafted olefinic rubber and/or said grafted acrylic rubber is (are) blended in said thermoplastic resin in an amount between 1 and 80% by weight and when said thermoplastic resin composition for molding is molded, the resulting resin mold has substantially same mechanical properties as the resin mold made of unused thermoplastic resin.

2. A thermoplastic resin composition in accordance with claim 1, wherein IZOD impact strength (ASTM-D256) of said thermoplastic resin material is maintained at unheated thermoplastic resin's IZOD impact strength of 70% or over after said thermoplastic resin material is heated at 250° C. for 1.0 hour.

3. A thermoplastic resin composition in accordance with claim 1 wherein a graft ratio of said grafted olefinic rubber and/or said grafted acrylic rubber is (are) higher than 20% and over by weight.

4. A thermoplastic resin composition in accordance with claim 1, wherein said thermoplastic resin material is styrene polymer and said graft polymer chains of said grafted olefinic rubber and/or said grafted acrylic rubber are styrenic polymer chains.

5. A thermoplastic resin composition for molding comprising thermoplastic resin and grafted olefin rubber and/or grafted acrylic rubber having graft polymer chains which have compatibility with said thermoplastic resin wherein said grafted olefinic rubber and/or said grafted acrylic rubber is (are) added in said thermoplastic resin in an amount between 1 and 80% by weight so that when said thermoplastic resin composition is recycled, the resulting resin mold has substantially same mechanical properties as the resin mold made of unused thermoplastic resin, wherein said thermoplastic resin material is monomer having cyano group and styrene monomer copolymer and said graft polymer chains of said grafted olefinic rubber and/or said acrylic rubber are monomer having cyano group and styrenic monomer copolymer chain.

6. A thermoplastic resin composition in accordance with claim 1, wherein said thermoplastic resin material is polyphenylene ether resin or polymer alloy of polyphenylene ether and polystyrene and said grafted rubber comprises styrene graft-copolymerized olefin rubber and/or acrylic rubber.

7. A thermoplastic resin composition for molding comprising thermoplastic resin and grafted olefin rubber and/or grafted acrylic rubber having graft polymer chains which have compatibility with said thermoplastic resin wherein said grafted olefinic rubber and/or said grafted acrylic rubber is (are) added in said thermoplastic resin in an amount between 1 and 80% by weight so that when said thermoplastic resin composition is recycled, the resulting resin mold has substantially same mechanical properties as the resin mold made of unused thermoplastic resin, wherein said olefinic monomer rubber(s) is (are) ethylene-propylene copolymer and/or ethylene-propylene-diene terpolymer.

8. A thermoplastic resin composition in accordance with claim 7, wherein said ethylene/propylene-diene terpolymer is ethylene-propylene-dicyclopentadiene terpolymer.

9. A thermoplastic resin composition in accordance with claim 7, wherein a molar ratio of ethylene/propylene in said ethylene-propylene copolymer or said ethylene-propylene-diene terpolymer is 60/40 and over.

10. A thermoplastic resin composition in accordance with claim 7, wherein Mooney viscosity ($ML_{1+4}$, 100EC) of said ethylene-propylene copolymer or ethylene-propylene-diene terpolymer is in the range of 5 to 150.

11. A thermoplastic resin composition in accordance with claim 1, wherein said acrylic rubber is a copolymer of n-butyl acrylate and butadiene, and a molar ratio of n-butyl acrylate/butadiene of said acrylic rubber is 50/50 and over.

12. A thermoplastic resin composition for molding comprising thermoplastic resin and grafted olefin rubber and/or grafted acrylic rubber having polymer chains which have compatibility with said thermoplastic resin wherein said and/or said grafted acrylic rubber is (are) added in said thermoplastic resin an amount between 1 and 80% by weight so that when said thermoplastic resin composition is recycled, the resulting resin mold has substantially same mechanical properties as the resin mold made of unused thermoplastic resin, wherein monomer having cyano group and styrenic nonomer are graft-copolymerized to said acrylic robber in a weight ratio in the range of 20/80 to 30/70.

13. A method for recycle of thermoplastic resin mold comprising molding by using a thermoplastic resin composition for molding comprising thermoplastic resin and grafted olefin rubber and/or grafted acrylic rubber having graft polymer chains which have compatibility with said thermoplastic resin wherein said grafted olefinic rubber and/or said grafted acrylic rubber is (are) added in said thermoplastic resin in an amount between 1 and 80% by weight so that when said thermoplastic resin composition is recycled, the resulting resin mold has substantially same mechanical properties as the resin mold made of unused thermoplastic resin, wherein said thermoplastic resin composition is molding material of a discarded resin mold and producing a resin mold having substantially equal quality to the preceding resin mold.

14. A method for recycle of thermoplastic resin mold in accordance with claim 13, wherein IZOD impact strength (ATM-D256) of said resin mold is 90% and over of said preceding resin mold.

* * * * *